(12) United States Patent
Sirowatka et al.

(10) Patent No.: US 12,429,037 B1
(45) Date of Patent: Sep. 30, 2025

(54) DUAL LINEAR SHAPE MEMORY ALLOY WIRE FOR ACTUATOR

(71) Applicant: GM Global Technology Operations LLC, Detroit, MI (US)

(72) Inventors: Brenton John Sirowatka, Clarkston, MI (US); Rami Z. Sayed, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/778,377

(22) Filed: Jul. 19, 2024

(51) Int. Cl.
*F03G 7/06* (2006.01)

(52) U.S. Cl.
CPC ....... *F03G 7/06143* (2021.08); *F03G 7/0616* (2021.08)

(58) Field of Classification Search
CPC ......................................................... F03G 7/06
See application file for complete search history.

(56) References Cited

U.S. PATENT DOCUMENTS

| | | | | |
|---|---|---|---|---|
| 2013/0002933 A1* | 1/2013 | Topliss | ................. | H04N 23/60 |
| | | | | 310/306 |
| 2018/0149142 A1* | 5/2018 | Bunting | .................... | G02B 7/08 |
| 2020/0347833 A1 | 11/2020 | Dankbaar et al. | | |
| 2021/0156367 A1* | 5/2021 | Howarth | ................ | H01R 4/182 |

FOREIGN PATENT DOCUMENTS

| | | | | |
|---|---|---|---|---|
| CN | 117167226 A | | 12/2023 | |
| DE | 102016224634 A1 | | 6/2017 | |
| DE | 202017102844 U1 | | 1/2018 | |
| GB | 2608769 A | * | 1/2023 | ............. G06F 3/016 |
| KR | 102006082107 A | | 7/2006 | |

\* cited by examiner

*Primary Examiner* — Shafiq Mian
(74) *Attorney, Agent, or Firm* — Honigman LLP; Matthew H. Szalach; Jonathan P. O'Brien (57) ABSTRACT

A shape memory alloy (SMA) wire assembly includes a first crimp, a second crimp, a metallic bridge, a first SMA wire, and a second SMA wire. The metallic bridge includes a first wire end and a second wire end opposite the first wire end. The first SMA wire is configured in a linear orientation and includes a first mounting end and a first bridge end opposite the first mounting end. The first bridge end is fixedly coupled to the first wire end of the metallic bridge via the first crimp. The second SMA wire is configured in the linear orientation and includes a second mounting end and a second bridge end opposite the second mounting end. The second bridge end is fixedly coupled to the second wire end of the metallic bridge via the second crimp.

19 Claims, 5 Drawing Sheets

FIG. 1

FIG. 3  FIG. 4

DUAL LINEAR SHAPE MEMORY ALLOY WIRE FOR ACTUATOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a shape memory alloy (SMA) wire assembly for an actuator that may be included with a vehicle.

Actuators may be included in vehicles to perform various functions and operations based on a respective vehicle component. For example, an actuator may be included in a vehicle seat assembly to control airflow at an air-filled lumbar via operation of the actuator. Such actuators often incorporate an SMA wire that controls operation of the actuator which, in turn, controls airflow to the air-filled lumbar of the vehicle seat.

The SMA wire includes a bent portion that presses against a plastic body of the actuator. The plastic body is engaged with a spring of the actuator, and the SMA wire includes two ends that are fixed to the actuator. The SMA wire also includes two linear portions, each of which connect the bent portion to each end of the SMA wire. In most cases, all portions of the SMA wire are continuous and are of a single wire. During operation, the SMA wire included in the actuator receives an electrical charge, allowing electrical current to flow through the SMA wire. When electrical current flows through the SMA wire, the SMA wire undergoes solid-state phase transformation along at least one linear axis, allowing the SMA wire to contract. As the two ends of the SMA wire are fixed to the actuator, when the SMA wire contracts, a force applied to the plastic body from the SMA wire is increased, forcing the plastic body to linearly move and compress the spring. When electrical current ceases from flowing through the SMA wire, the SMA wire returns to its original orientation, allowing the spring to decompress and return the plastic body to its initial location.

The movement of the plastic body that is facilitated by phase transformation of the SMA wire enables operation of the vehicle component in which the actuator is engaged, such as, continuing with the above example, the air-filled lumbar of the vehicle seat assembly. The actuator controls the flow of air into and out of the air-filled lumbar based on the movement of the plastic body in the actuator. However, as the SMA wire includes the bent portion that partially wraps around the plastic body, failure and breaking of the SMA wire may occur where the bent portion meets each linear portion. The failure may be commonly caused by thermal differences of the bent portion and the linear portions of the SMA wire when the SMA wire receives an electrical current, as the bent portion is pressed against the plastic body, and the linear portions are in free space. When failure occurs, the SMA wire snaps and breaks, rendering the actuator non-functional. It is desired to have an SMA wire that is reinforced where the linear portion meets the bent portion, thus reducing the potential for SMA wire failure.

SUMMARY

One aspect of the disclosure provides a shape memory alloy (SMA) wire assembly. The SMA wire assembly includes a first crimp, a second crimp, a metallic bridge, a first SMA wire, and a second SMA wire. The metallic bridge includes a first wire end and a second wire end opposite the first wire end. The first SMA wire is configured in a linear orientation and includes a first mounting end and a first bridge end opposite the first mounting end. The first bridge end is fixedly coupled to the first wire end of the metallic bridge via the first crimp. The second SMA wire is configured in the linear orientation and includes a second mounting end and a second bridge end opposite the second mounting end. The second bridge end is fixedly coupled to the second wire end of the metallic bridge via the second crimp.

Implementations of the disclosure may include one or more of the following optional features. In some examples, the first SMA wire has a first length and a first tension and the second SMA wire has a second length and a second tension, the first length is equal to the second length and the first tension is equal to the second tension.

In some implementations, the first crimp and the second crimp are integrally formed with the metallic bridge, the first crimp disposed at the first wire end of the metallic bridge and the second crimp disposed at the second wire end of the metallic bridge.

In some aspects, the first wire end of the metallic bridge is configured to receive the first crimp, and the second wire end of the metallic bridge is configured to receive the second crimp.

In some configurations, the SMA wire assembly further includes an actuator including a plastic body with the metallic bridge coupled to the plastic body.

In some further configurations, the first crimp and the second crimp are rigidly and fixedly attached to the plastic body of the actuator.

In some other further configurations, the metallic bridge is configured to be over-molded to the plastic body of the actuator.

In some other further configurations, the metallic bridge is configured to be engaged with a pocket of the plastic body of the actuator.

In some examples, the first SMA wire and the second SMA wire each includes a conductive material that is configured to accommodate linear solid-state phase transformation of the first SMA wire and the second SMA wire.

Another aspect of the disclosure provides an actuator. The actuator includes a plastic body and an SMA wire assembly. The SMA wire assembly includes a first crimp, a second crimp, a metallic bridge, a first SMA wire, and a second SMA wire. The metallic bridge includes a first wire end and a second wire end opposite the first wire end. The first SMA wire is linearly configured and includes a first mounting end, a first bridge end opposite the first mounting end, and a conductive material. The first bridge end is fixedly coupled to the first wire end of the metallic bridge via the first crimp, and the conductive material is configured to accommodate linear solid-state phase transformation of the first SMA wire. The second SMA wire is linearly configured and includes a second mounting end, a second bridge end opposite the second mounting end, and a conductive material. The second bridge end is fixedly coupled to the second wire end of the metallic bridge via the second crimp, and the conductive material is configured to accommodate linear solid-state phase transformation of the second SMA wire.

Implementations of this aspect of the disclosure may include one or more of the following optional features. In some examples, the first SMA wire has a first length and a first tension and the second SMA wire has a second length and a second tension, the first length being equal to the second length and the first tension being equal to the second tension.

In some implementations, the first crimp and the second crimp are integrally formed with the metallic bridge, the first crimp disposed at the first wire end of the metallic bridge and the second crimp disposed at the second wire end of the metallic bridge.

In some aspects, the first wire end of the metallic bridge is configured to receive the first crimp, and the second wire end of the metallic bridge is configured to receive the second crimp.

In some configurations, the metallic bridge is coupled to the plastic body.

In some examples, the metallic bridge is configured to be over-molded to the plastic body.

In some implementations, the metallic bridge is configured to be engaged with a pocket of the plastic body.

Yet another aspect of the disclosure provides a vehicle. The vehicle includes an actuator. The actuator includes a plastic body and an SMA wire assembly. The SMA wire assembly includes a first crimp, a second crimp, a metallic bridge, a first SMA wire, and a second SMA wire. The metallic bridge includes a first wire end and a second wire end opposite the first wire end. The first SMA wire is linearly configured and includes a first mounting end and a first bridge end opposite the first mounting end, and a conductive material. The first bridge end is fixedly coupled to the first wire end of the metallic bridge via the first crimp, and the conductive material is configured to accommodate linear solid-state phase transformation of the first SMA wire. The second SMA wire is linearly configured and includes a second mounting end and a second bridge end opposite the second mounting end, and a conductive material. The second bridge end is fixedly coupled to the second wire end of the metallic bridge via the second crimp, and the conductive material is configured to accommodate linear solid-state phase transformation of the second SMA wire.

Implementations of this aspect of the disclosure may include one or more of the following optional features. In some examples, the first crimp and the second crimp are integrally formed with the metallic bridge, the first crimp disposed at the first wire end of the metallic bridge and the second crimp disposed at the second wire end of the metallic bridge.

In some implementations, the first wire end of the metallic bridge is configured to receive the first crimp, and the second wire end of the metallic bridge is configured to receive the second crimp.

In some aspects, the metallic bridge is coupled to the plastic body.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
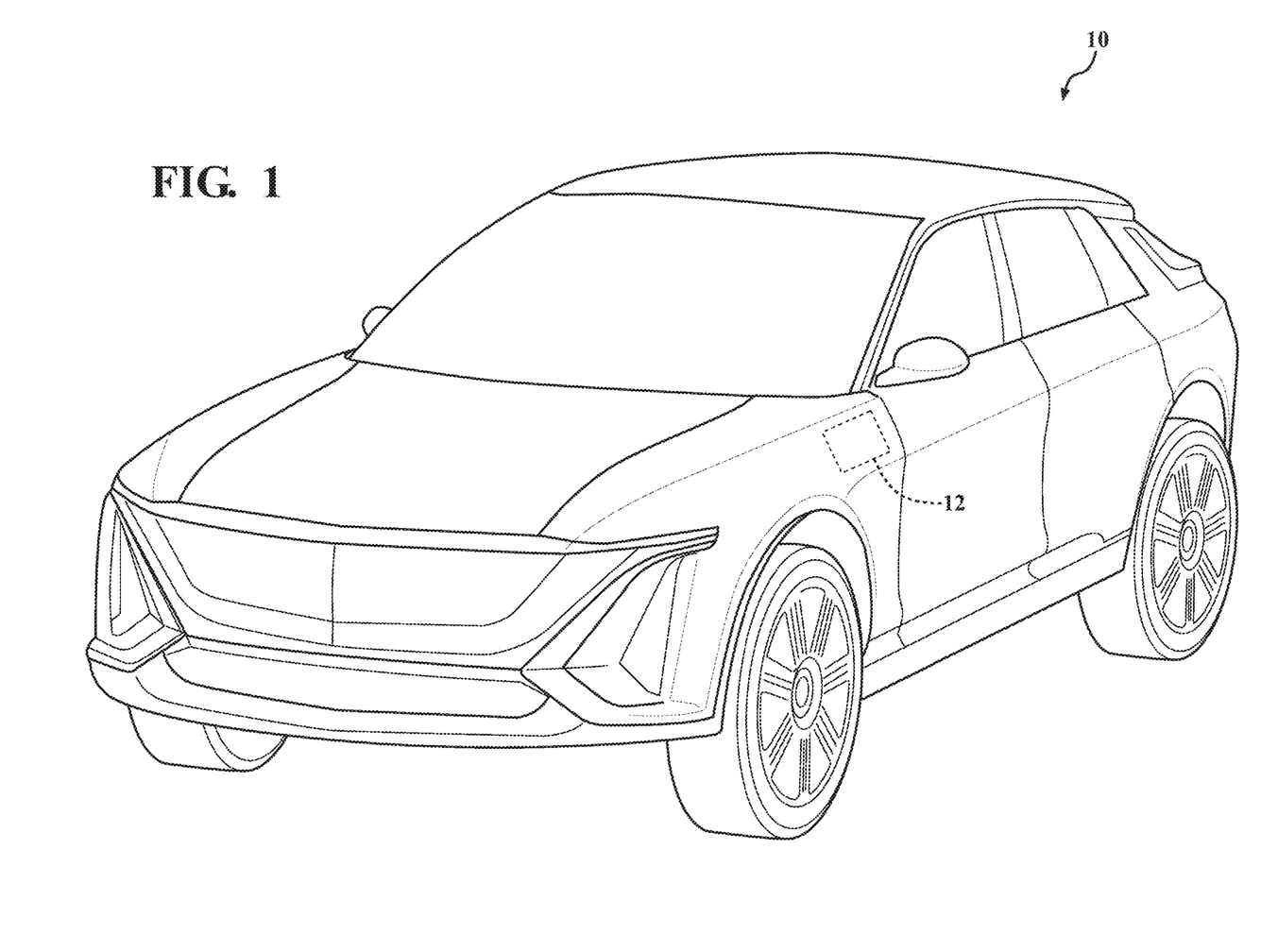
FIG. 1 is a perspective view of a vehicle including an actuator according to the present disclosure.
Figure 2A:
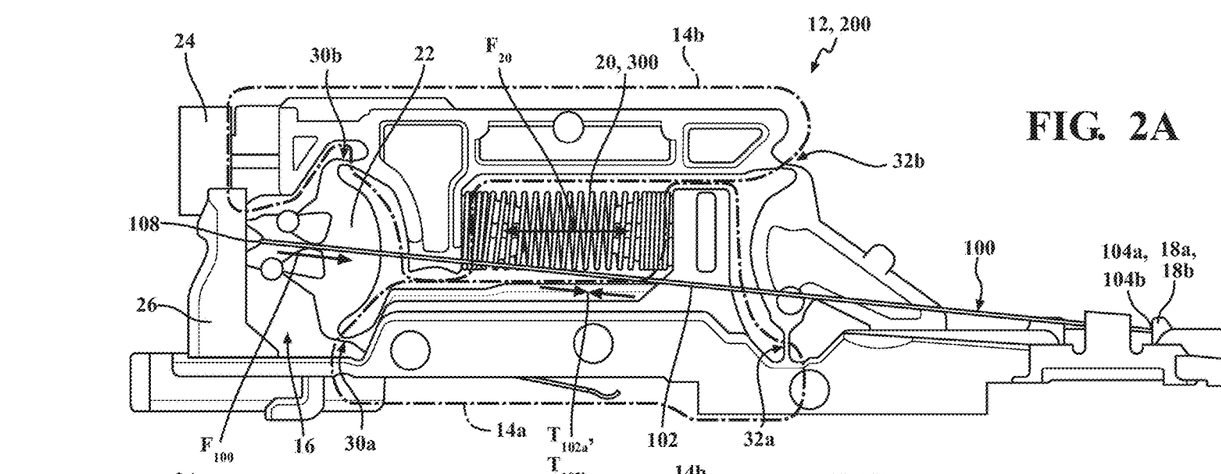
FIG. 2A is a side view of an actuator in a first position including a dual linear shape memory alloy wire according to the present disclosure.

With reference to FIGS. 1 and 2A, a vehicle 10 includes an actuator 12 configured to facilitate the operation of a vehicle component within the vehicle 10. It should be noted, however, that the specific configuration of the actuator 12, the vehicle component operated by the actuator 12, as well as the operation performed, may vary without deviating from the context of this disclosure. The actuator 12 includes a lower body 14a, an upper body 14b, and a cavity 16 that is at least partially defined by the lower body 14a and the upper body 14b. The upper body 14b is moveable in relation to the lower body 14a, as the lower body 14a is fixed and immovable. Furthermore, the actuator 12 includes a first mounting point 18a and a second mounting point 18b that are fixed at the lower body 14a of the actuator 12. A spring 20 is included within the cavity 16 of the actuator 12 and is fixed to both the lower body 14a and the upper body 14b. The spring 20 exerts a compression force $F_{20}$ against the lower body 14a and the upper body 14b.

A plastic body 22 is included within the cavity that is hingedly connected to both that lower body 14a and the upper body 14b. The plastic body 22 is free of electrically conductive material and is linearly and hingedly moveable in relation to the lower body 14a. For example, linear movement of the upper body 14b and the plastic body 22 results in either increased or decreased compression force $F_{20}$ of the spring 20. While the spring 20 may exist in various states of compression during operation of the actuator 12, some states of compression being greater than other states of compression, the spring 20 maintains a degree of compression during operation and non-operation of the actuator 12. The compression force $F_{20}$ of the spring 20 varies during operation of the actuator 12, the details of which are explained in greater detail below.

Figure 2B:
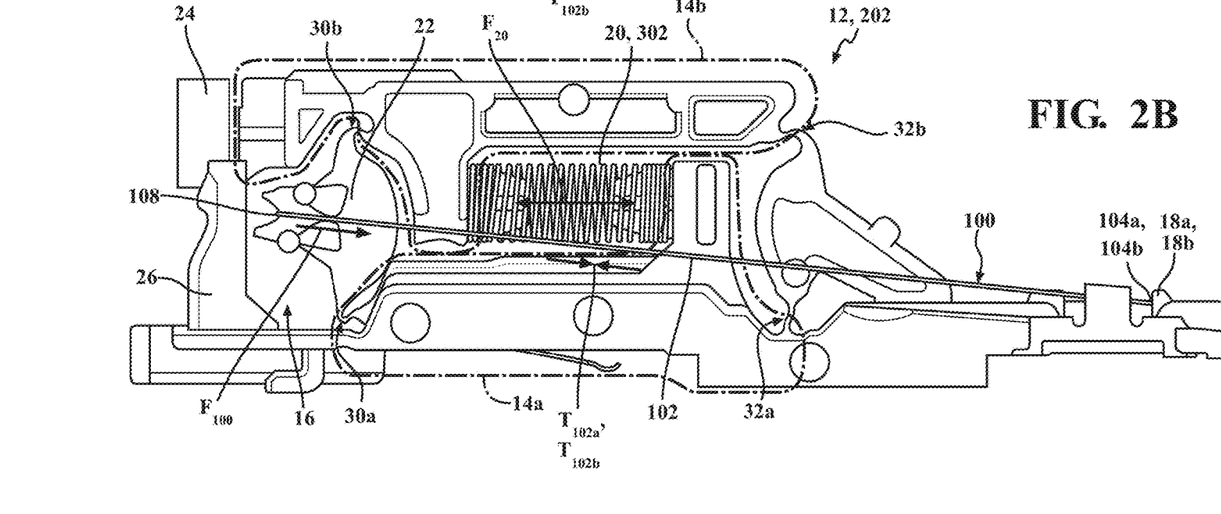
FIG. 2B is a side view of the actuator of FIG. 2A in a second position including the dual linear shape memory alloy wire of FIG. 2A.

With reference to FIGS. 2A and 2B, the actuator 12 may be in a first state 200 or a second state 202 during operation of the actuator 12. When the actuator 12 is in the first state 200, the spring 20 of the actuator 12 is in a first compression state 300. When the actuator 12 is in the second state 202, the spring 20 of the actuator 12 is in a second compression state 302. The spring 20 is less compressed and exerts less compression force $F_{20}$ in the first compression state 300 compared to the spring 20 at the second compression state 302. Furthermore, the spring 20 may travel between the first compression state 300 and the second compression state 302 during operation of the actuator 12. In other words, the spring 20 compresses when the actuator translates from the first state 200 to the second state 202. Alternatively, the spring 20 may at least partially decompress when the actuator 12 translates from the second state 202 to the first state 200.

With further reference to FIGS. 2A and 2B, when the actuator 12 is in the first state 200 and the spring 20 is in the first compression state 300, the spring 20 forces the upper body 14b to forcibly engage with a seal tip 24 of the actuator 12. Furthermore, when the actuator 12 is in the first state 200, the plastic body 22 is at or near an air shield 26 of the actuator 12. The air shield 26, in conjunction with the lower body 14a and the upper body 14b, defines the cavity 16 of the actuator 12. When the upper body 14b is forcibly engaged with the seal tip 24, the seal tip 24 is sealed and gasses are prevented from entering or escaping the cavity 16 of the actuator 12. However, when the actuator 12 is in the second state 202 and the spring 20 is in the second compression state 302, the spring 20 is compressed to a greater extent compared to the spring 20 in the first compression state 300. Since the spring 20 is fixed to the upper body 14b and the plastic body 22 is hingedly connected to the upper body 14b, the plastic body 22 hinges and linearly moves in conjunction with both the linear movement of the upper body 14b and the increased compression of the spring 20. Movement of the upper body 14b, the plastic body 22, and the spring 20 occurs as the actuator 12 translates between the first state 200 and the second state 202 and the spring 20 moves between the first compression state 300 and the second compression state 302. The movement as described above is facilitated by hinging at a plurality of hingeable elbows 30a, 30b, 32a, 32b included in the actuator 12. The plurality of hingeable elbows 30a, 30b, 32a, 32b may be of a material and thickness that accommodates plastic deformation, thus enabling hinging at the hingeable elbows 30a, 30b, 32a, 32b.

As a result of the actuator 12 translating from the first state 200 to the second state 202, the plastic body 22 moves away from the air shield 26 and the upper body 14b disengages from the seal tip 24. When the upper body 14b is disengaged from the seal tip 24, gasses are capable of entering and escaping the cavity 16 of the actuator 12. When the actuator 12 translates from the second state 202 to the first state 200, the upper body 14b re-engages with the seal tip 24, once again sealing the actuator 12 and preventing gasses entering or escaping the cavity 16. The facilitation of translating the actuator 12 between the first state 200 and the second state 202, as well as conjunctively moving the spring 20 between the first compression state 300 and the second compression state 302, is accommodated by a shape memory alloy (SMA) wire assembly 100 included in the actuator 12, the operation of which is described in further detail below.

Referring now to FIGS. 2A-4, the SMA wire assembly 100 includes a pair of SMA wires 102 including a first SMA wire 102a and a second SMA wire 102b. The first SMA wire 102a includes a first mounting end 104a and a first bridge end 106a. The first mounting end 104a is positioned on an opposing distal end of the first SMA wire 102a from the first bridge end 106a. Similarly, the second SMA wire 102b includes a second mounting end 104b and a second bridge end 106b. The second mounting end 104b is positioned on an opposing distal end of the second SMA wire 102b from the second bridge end 106b.

The pair of SMA wires 102 are linearly oriented when installed in the actuator 12. In this regard, the SMA wire assembly 100 has a dual linear configuration. In other words, the pair of SMA wires 102 are straight and unbent between the first and second mounting ends 104a, 104b and the bridge ends 106a, 106b. Furthermore, the pair of SMA wires 102 include a conductive material that includes solid-state phase transformation properties. In other words, the pair of SMA wires 102 may linearly contract, compress, or shorten when an electric current flows through the SMA wire assembly 100. When the electric current ceases from flowing through the SMA wire assembly 100, the pair of SMA wires 102 lengthen or decompress, such that the pair of SMA wires 102 are no longer contracted. The SMA wire assembly 100 is free from degradation or otherwise diminished integrity after the contraction and decompression of the pair of SMA wires 102 as a result of the dual linear configuration of the pair of SMA wires 102.

The SMA wire assembly 100 further includes a bridge 108. The bridge 108 is of a metallic conductive material that enables the flow of electrical current between the first SMA wire 102a and the second SMA wire 102b. It is important to note that the bridge 108 is free of solid-state phase transformation properties. In other words, the bridge 108 maintains a singular shape, orientation, and dimension regardless of electrical current flowing through the SMA wire assembly 100. The bridge 108 may be configured as a tubular wire, a flat band, a flat tab, or any practicable configuration based on the configuration of the actuator 12. The bridge 108 includes a first SMA wire end 110a and a second SMA wire end 110b opposite the first SMA wire end 110a.

Figure 3:
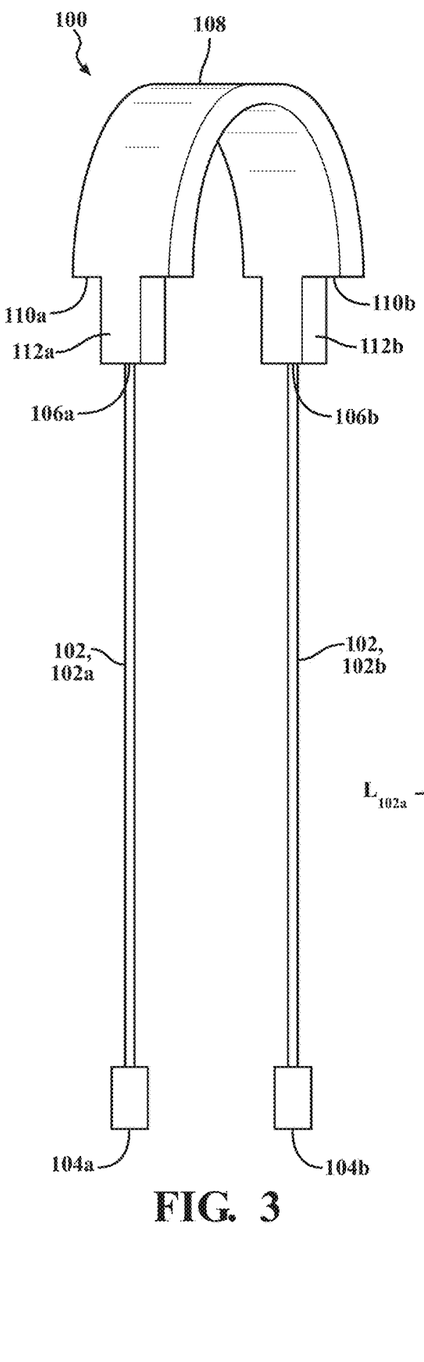
FIG. 3 is a perspective view of a dual linear shape memory alloy wire according to the present disclosure.
Figure 4:
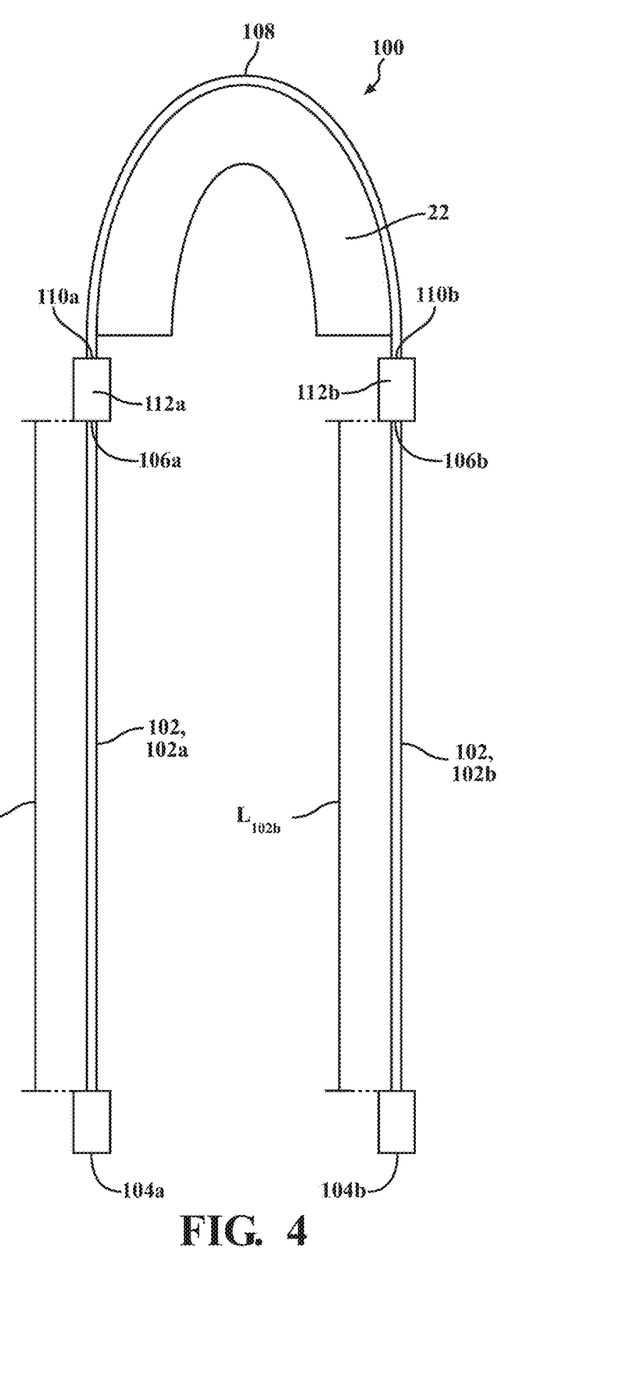
FIG. 4 is a side view of a dual linear shape memory alloy wire and a plastic body.

Referring still to FIGS. 2A-4, the first SMA wire end 110a of the bridge 108 is electrically connected and fixed to the first bridge end 106a of the first SMA wire 102a via a first crimp 112a. The first crimp 112a facilitates the fixed and electrical connection between the bridge 108 and the first SMA wire 102a. Likewise, the second SMA wire end 110b of the bridge 108 is electrically connected and fixed to the second bridge end 106b of the second SMA wire 102b via a second crimp 112b. The first crimp 112a and the second crimp 112b may be integrated into the configuration of the bridge 108. For example, the first crimp 112a and the second crimp 112b may be integrally formed with the bridge 108, as illustrated in FIG. 3. Alternatively, the first crimp 112a and the second crimp 112b may be independent from the configuration of the bridge 108, as illustrated in FIG. 4. If the first crimp 112a and the second crimp 112b are independent from the configuration of the bridge 108, the first SMA wire end 110a and the second SMA wire end 110b of the bridge 108 may be configured as tabs or include a tab-like orientation to enable accepting of the first crimp 112a at the first SMA wire end 110a and accepting of the second crimp 112b at the second SMA wire end 110b.

When the SMA wire assembly 100 is installed within the cavity 16 of the actuator 12, the first mounting end 104a of the first SMA wire 102a is fixedly attached to the first mounting point 18a of the actuator 12. Likewise, the second mounting end 104b of the second SMA wire 102b is fixedly attached to the second mounting point 18b of the actuator 12. The attachment of the first mounting end 104a to the first mounting point 18a and the second mounting end 104b to the second mounting point 18b may be achieved via crimping, welding, bolting, or any practicable means based on the configuration of the actuator 12. Both SMA wires 102 remain linear and unbent when installed at the actuator 12. Furthermore, the pair of SMA wires 102 may be parallel to one another or angled with respect to one another, depending on the configuration of the actuator 12. The first SMA wire 102a includes a first length $L_{102a}$, while the second SMA wire 102b includes a second length $L_{102b}$. Both the first length $L_{102a}$ and the second length $L_{102b}$ may vary during operation of the actuator 12 and may be equal to one another based on the configuration of the actuator 12. Furthermore, the first SMA wire 102a includes a first tension $T_{102a}$ that may be equal to a second tension $T_{102b}$ of the second SMA wire 102b. The first tension $T_{102a}$ is applied against the first SMA wire end 110a of the bridge 108 and the first mounting point 18a, while the second tension $T_{102b}$ is applied against the second SMA wire end 110b of bridge 108 and the second mounting point 18b. The first tension $T_{102a}$ of the first SMA wire 102a and the second tension $T_{102b}$ of the second SMA wire 102b vary during operation of the actuator 12 and is explained in greater detail below.

The bridge 108 is shaped and orientated to correspond to the shape and orientation of the plastic body 22. For example, in many configurations, the bridge 108 is curved or bent to accommodate the shape and orientation of the plastic body 22. In other words, the bridge 108 partially wraps around the plastic body 22, as the plastic body 22 is positioned between the bridge 108 and the first and second mounting ends 104a, 104b, of the first and second SMA wires 102a, 102b. The bridge 108 forcibly engages and presses against the plastic body 22. Likewise, the plastic body 22 is forcibly engaged against the bridge 108. The compression force $F_{20}$ of the spring 20 applied to the upper body 14b translates to the plastic body 22, causing the plastic body 22 to forcibly engage with the bridge 108. Since the compression force $F_{20}$ is translated and exerted against the plastic body 22, an SMA wire assembly force $F_{100}$ of the SMA wire assembly 100 exerts against the plastic body 22 due to the first tension $T_{102a}$ of the first SMA wire 102a and the second tension $T_{102b}$ of the second SMA wire 102b. The SMA wire assembly force $F_{100}$ is applied at the bridge 108 against the plastic body 22. The SMA wire assembly force $F_{100}$ is variable based on the operation of the actuator 12. Furthermore, the SMA wire assembly force $F_{100}$ corresponds to both the first tension $T_{102a}$ of the first SMA wire 102a and the second tension $T_{102b}$ of the second SMA wire 102b.

With continued reference to FIGS. 2A-4, controlling the flow of electric current through the SMA wire assembly 100 enables operation of the actuator 12. For example, the actuator performs an action when electric current flows through the SMA wire assembly 100. Likewise, the actuator performs an alternative action when electric current ceases from flowing through the SMA wire assembly 100. For example, the actuator 12 may be installed at a vehicle seat assembly to control an air-filled lumbar of the seat assembly, and a user may activate a lumbar control switch to vary the amount of lumbar at the seat assembly. When the lumbar control switch is activated, electric current may flow through SMA wire assembly 100. Likewise, when the lumbar control switch is deactivated, electric current may cease from flowing through the SMA wire assembly 100.

When no electric current is flowing through the SMA wire assembly 100, the actuator 12 is in the first state 200 and the spring 20 is in the first compression state 300. In the first compression state 300 of the spring 20, the compression force $F_{20}$ of the spring 20 is greater than the SMA wire assembly force $F_{100}$ which forces the upper body 14b to seal and forcibly engage with the seal tip 24. Additionally, in the first state 200 of the actuator, the plastic body 22 is engaged or nearly engaged with the air shield 26. As stated above, when the upper body 14b is forcibly engaged with the seal tip 24, the seal tip 24 is sealed, preventing gasses from entering or escaping the cavity 16 of the actuator 12.

Alternatively, the actuator 12 is in the second state 202 and the spring 20 is in the second compression state 302 when electric current flows through the SMA wire assembly 100. When electric current begins flowing through the SMA wire assembly 100, the pair of SMA wires 102 contract, and a first wire length $L_{102a}$ of the first SMA wire 102a and a second wire length $L_{102b}$ of the second SMA wire 102b decrease, due to the solid-state phase transformation properties of the pair of SMA wires 102. As the pair of SMA wires 102 undergo linear solid-state phase transformation by contracting and shortening, the first tension $T_{102a}$ of the first SMA wire 102a and the second tension $T_{102b}$ of the second SMA wire 102b increase, thus causing the SMA wire assembly force $F_{100}$ to concurrently increase. The increased SMA wire assembly force $F_{100}$ results in linear movement of the bridge 108 towards the mounting points 18a, 18b as a result of each of the first and second mounting ends 104a, 104b of the first and second SMA wires 102a, 102b being fixed to the first and second mounting point 18a, 18b. Linear movement of the bridge 108 towards the mounting points 18a, 18b occurs in conjunction with linear movement of the upper body 14b once the SMA wire assembly force $F_{100}$ is greater than the compression force $F_{20}$ of the spring 20.

Once the SMA wire assembly force $F_{100}$ exceeds the compression force $F_{20}$ of the spring 20, the SMA wire assembly force $F_{100}$ exerted from the bridge 108 against the plastic body 22, which is translated to the upper body 14b, moves the spring 20 from the first compression state 300 to the second compression state 302. When the spring 20 translates from the first compression state 300 to the second compression state 302, the compression force $F_{20}$ of the spring 20 increases. When the spring 20 reaches the second compression state 302, the compression force $F_{20}$ of the spring 20 equals the SMA wire assembly force $F_{100}$, which halts further compression of the spring and further contraction of the pair of SMA wires 102. Thus, any further movement of the bridge 108, the plastic body 22, and the upper body 14b is halted when the compression force $F_{20}$ equals the SMA wire assembly force $F_{100}$.

At the second state 202 of the actuator 12, while electric current flows through the SMA wire assembly 100, the upper body 14b is no longer forcibly engaged with the seal tip 24, which causes the seal tip 24 to unseal and accommodate the flow of gasses to either enter or exit the cavity 16. Additionally, the plastic body 22 is positioned away from the air shield 26. Continuing with the air-filled lumbar example described above, in the second state 202 of the actuator 12 and, conjunctively, the second compression state 302 of the spring 20, air may flow through the cavity 16 of the actuator 12 and either into or out of the air-filled lumbar, depending on the lumbar switch selected by the user, to either increase lumbar or decrease lumbar.

The actuator 12 translates from the second state 202 to the first state 200, just as the spring 20 moves from the second compression state 302 to the first compression state 300, when electric current ceases from flowing through the SMA wire assembly 100. When electric current ceases from flowing through the SMA wire assembly 100, such as when a user deactivates the lumbar control switch, the pair of SMA wires 102 undergo linear solid-state phase transformation yet again by lengthening and uncontracting, decreasing the first tension $T_{102a}$ of the first SMA wire 102a and the second tension $T_{102b}$ of the second SMA wire 102b. As the pair of SMA wires 102 lengthen and uncontract, the compression force $F_{20}$ of the spring 20 once again becomes greater than the SMA wire assembly force $F_{100}$. The spring 20 exerts the compression force $F_{20}$ against the upper body 14b, which translates to the plastic body 22, and is ultimately translated to the bridge 108. Thus, the bridge 108 may linearly move in conjunction with the linear movement of the plastic body 22 and the upper body 14b, while the first wire length $L_{102a}$ and the second wire length $L_{102b}$ increase, until the upper body 14b forcibly engages with the seal tip 24. As the upper body 14b forcibly engages with the seal tip 24 and prevents the upper body 14b and plastic body 22 from additional linear movement, the seal tip 24 is once again sealed, preventing the flow of gasses from entering or escaping the cavity 16 of the actuator 12. In doing so, with reference to the air-filled lumbar example, the lumbar of the seat assembly is ceased from adjusting until the lumbar control switch is once again activated, repeating the phase transformation process of the pair of SMA wires 102 as described above. It should be noted, however, that the actuator 12 may be used in any practicable manner within the vehicle 10, and the air-filled lumbar example as described above is merely one example.

When electric current flows through the SMA wire assembly 100, thermal properties at the pair of SMA wires 102 may be different from thermal properties at the bridge 108. The differences in thermal properties are due to the different configuration of the bridge 108 compared to the configuration of the pair of SMA wires 102. The differences in thermal properties may also be a result of the engagement of bridge 108 against the plastic body 22 as compared to the pair of SMA wires 102, which are suspended within the cavity 16.

Figure 5A:
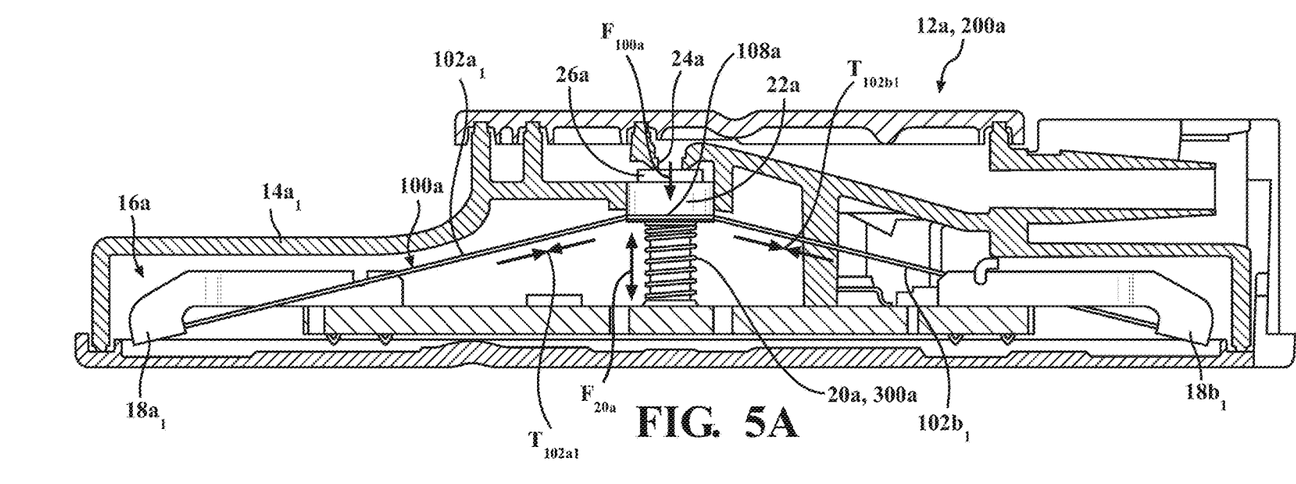
FIG. 5A is a side cross-sectional view of an actuator in a first position including a dual linear shape memory alloy wire according to the present disclosure.
Figure 5B:
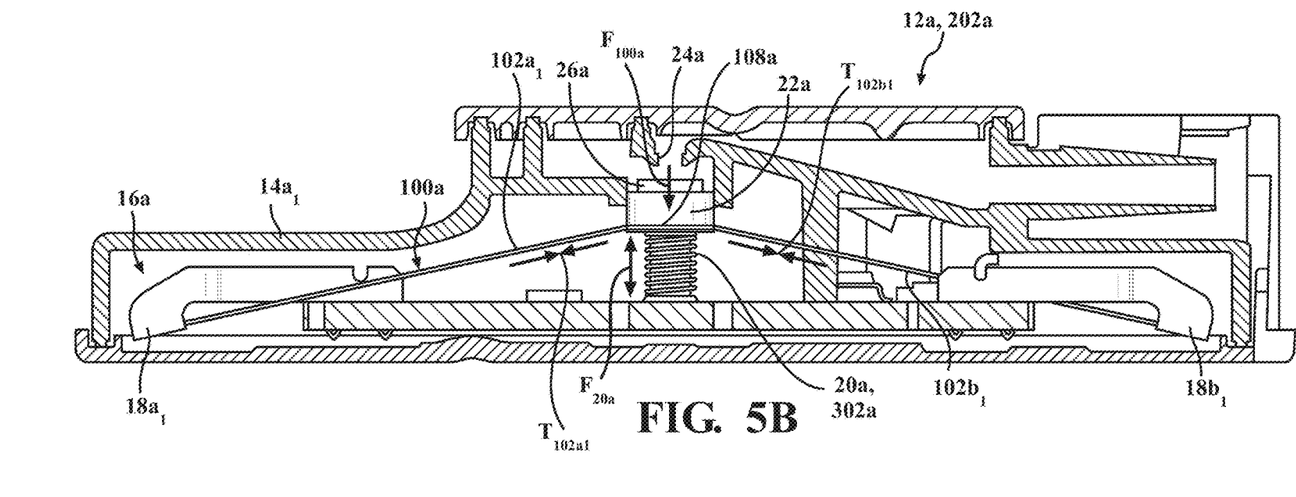
FIG. 5B is a side cross-sectional view of the actuator of FIG. 5A in a second position including the dual linear shape memory alloy wire of FIG. 5A.

With particular reference to FIG. 5A-5B, an actuator 12a is provided. In view of the substantial similarity in structure and function of the components associated with the actuator 12, like reference numerals are used hereinafter and in the drawings to identify like components while like reference numerals containing letter and/or number extensions are used to identify those components that have been modified.

The actuator 12a includes a casing $14a_1$ that defines a cavity 16a of the actuator 12a. A first mounting point $18a_1$ and a second mounting point $18b_1$ are positioned at opposing ends of the casing 14a1. Both the first mounting point $18a_1$ and the second mounting point $18b_1$ are fixedly attached to the actuator 12a and are unmovable in relation to the casing 14a1. A spring 20a is positioned at a position equidistant from the mounting points $18a_1$, $18b1$. The spring 20a is fixed to a plastic body 22a that is fixedly engaged with an air shield 26a. During a first state 200a of the actuator 12a and a first compression state 300a of the spring 20a, the spring 20a forces the plastic body 22a and the air shield 26a against a seal tip 24a of the actuator 12a. The plastic body 22a and air shield 26a being forced against the seal tip 24a prevents gasses from entering or escaping the cavity 16a of the actuator 12a. Alternatively, during a second state 202a of the actuator 12 and a second compression state 302a of the spring, the plastic body 22a and the air shield 26a are moved away from the seal tip 24a, which allows for the flow of gasses to enter and exit the cavity 16a of the actuator 12a at the seal tip 24a.

The actuator 12a includes an SMA wire assembly 100a. The SMA wire assembly 100a includes a first SMA wire $102a_1$ and a second SMA wire $102b_1$. Furthermore, the SMA wire assembly 100a includes a bridge 108a that is engaged with the plastic body 22a. The first SMA wire $102a_1$ is linearly configured and fixed to the first mounting point $18a_1$ and the bridge 108a at opposing distal ends of the first SMA wire $102a_1$. The second SMA wire $102b_1$ is linearly configured and fixed to the second mounting point $18b_1$ and the bridge 108a at opposing distal ends of the second SMA wire $102b_1$.

The first SMA wire $102a_1$ includes a first tension $T_{102a1}$ and the second SMA wire $102b_1$ includes a second tension $T_{102b1}$. The first tension $T_{102a1}$ is applied between the bridge 108a and the first mounting point $18a_1$, while the second tension $T_{102b1}$ is applied between the bridge 108a and the second mounting point $18b_1$. As a result of the first tension $T_{102a1}$ and the second tension $T_{102b1}$, an SMA wire assembly force $F_{100a}$ is generated at the bridge 108a. The SMA wire assembly force $F_{100a}$ is translated to the plastic body 22a and is directed downward towards the spring 20a. The spring 20a exerts a compression force $F_{20a}$ against the plastic body 22a. The amount of compression force $F_{20a}$ generated by the spring 20a differs between the first compression state 300a and the second compression state 302a.

With continued reference to FIG. 5A-5B, when no electric current is flowing through the SMA wire assembly 100a, the actuator 12a is in the first state 200a and the spring 20a is in the first compression state 300a (FIG. 5A). Alternatively, the actuator 12a is in the second state 202a and the spring 20a is in the second compression state 302a when electric current flows through the SMA wire assembly 100a (FIG. 5B). When electric current begins flowing through the SMA wire assembly 100a, the first and second SMA wires $102a_1$, $102b_1$ contract and shorten in length due to the solid-state phase transformation properties of the first and second SMA wires $102a_1$, $102b_1$. As the first and second SMA wires $102a_1$, $102b_1$ undergo linear solid-state phase transformation by contracting and shortening, the first tension $T_{102a1}$ of the first SMA wire $102a_1$ and the second tension $T_{102b1}$ of the second SMA wire $102b_1$ increase, thus causing the SMA wire assembly force $F_{100a}$ to concurrently increase. Since the first and second SMA wires $102a_1$, $102b_1$ are fixed to the first and second mounting point $18a_1$, $18b_1$, the increased SMA wire assembly force $F_{100}$ results in linear movement of the bridge 108a, the plastic body 22a, and the air shield 26a, away from the seal tip 24a and towards the spring 20a. The linear movement occurs since the SMA wire assembly force $F_{100a}$ increased to an amount greater than the compression force $F_{20a}$ of the spring 20a. This movement compresses the spring 20a from the first compression state 300a to the second compression state 302a. The second compression state 302a of the spring 20a, as well as the second state 202a of the actuator 12a, is achieved once the compression force $F_{20}$ of the spring 20a increases to an amount equal to the SMA wire assembly force $F_{100a}$, at which point, movement of the plastic body 22a in conjunction with the bridge 108a and the air shield 26a is halted. Electric current continues flowing through the SMA wire assembly 100a at the second compression state 302a of the spring 20a and the second state 202a of the actuator 12a.

At the second state 202a of the actuator 12a, while electric current flows through the SMA wire assembly 100a, the air shield 26a is no longer forcibly engaged with the seal tip 24a, which causes the seal tip 24a to unseal and accommodate the flow of gasses to either enter or exit the cavity 16a. Continuing with the air-filled lumbar example described above, in the second state 202a of the actuator 12a and, conjunctively, the second compression state 302a of the spring 20a, air may flow through the cavity 16a of the actuator 12a and either into or out of the air-filled lumbar, depending on the lumbar switch selected by the user, to either increase lumbar or decrease lumbar.

The actuator 12a translates from the second state 202a to the first state 200a, just as the spring 20a moves from the second compression state 302a to the first compression state 300a, when electric current ceases from flowing through the SMA wire assembly 100a. When electric current ceases from flowing through the SMA wire assembly 100a, such as, for example, when the user deactivates the lumbar control switch, the first and second SMA wires $102a_1$, $102b_1$ undergo linear solid-state phase transformation yet again by increasing in length and uncontracting, decreasing the first tension $T_{102a1}$ of the first SMA wire $102a_1$ and the second tension $T_{102b1}$ of the second SMA wire $102b_1$. As the first and second SMA wires $102a_1$, $102b_1$ lengthen and uncontract, the compression force $F_{20a}$ of the spring 20a becomes greater than the SMA wire assembly force $F_{100a}$. The spring 20a exerts the compression force $F_{20a}$ against the plastic body 22a, which translates to the bridge 108a and the air shield 26a. Thus, the bridge 108a may linearly move in conjunction with the linear movement of the plastic body 22a and the air shield 26a until the air shield 26a forcibly engages with the seal tip 24a. As the air shield 26a forcibly engages with the seal tip 24a and prevents the bridge 108a, the plastic body 22a, and the air shield 26a from additional linear movement, the seal tip 24a is once again sealed, preventing the flow of gasses from entering or escaping the cavity 16a of the actuator 12a. In doing so, with reference to the air-filled lumbar example, the lumbar of the seat assembly is ceased from adjusting until the lumber control switch is once again activated, repeating the phase transformation process of the first and second SMA wires $102a_1$, $102b_1$ as described above. It should be noted, however, that the actuator 12 may be used in any practicable manner within the vehicle 10, and the air-filled lumbar example as described above is merely one example.

Figure 6:
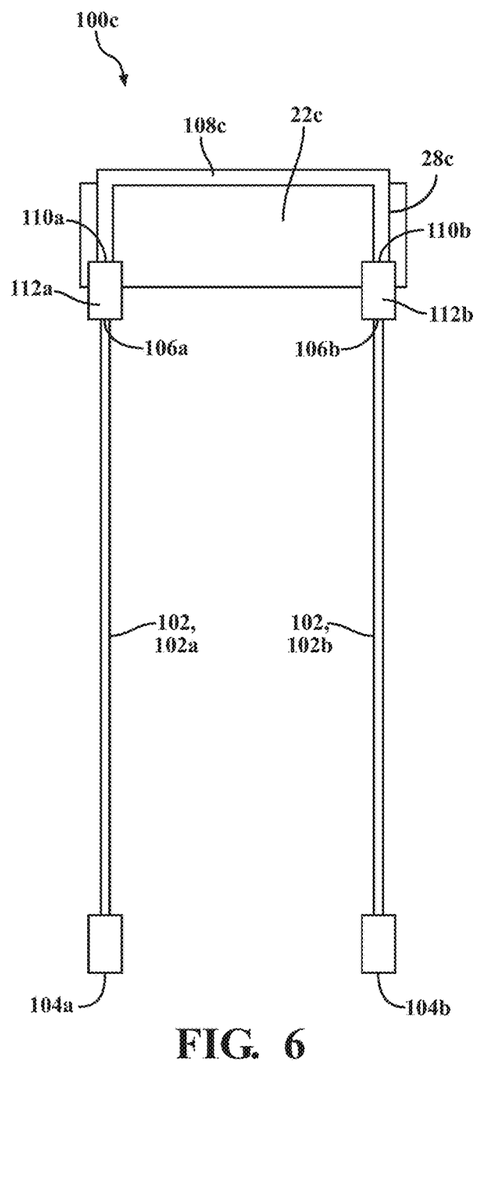
FIG. 6 is a side view of a dual linear shape memory alloy wire and a plastic body with a bridge pocket feature.

With particular reference to FIG. 6, an SMA wire assembly 100c is provided. In view of the substantial similarity in structure and function of the components associated with the SMA wire assembly 100, like reference numerals are used hereinafter and in the drawings to identify like components while like reference numerals containing letter and/or number extensions are used to identify those components that have been modified.

The SMA wire assembly 100c includes a bridge 108c that engages with a plastic body 22c when installed in the actuator 12 (FIG. 2). The bridge 108c, a portion of the first crimp 112a, and a portion of the second crimp 112b, are positioned within a pocket 28c of the plastic body 22c. For example, the pocket 28c may be described as an indent, cavity, or any other recessed opening that receives the bridge 108c and at least a portion of the first and second crimps 112a, 112b. The pocket 28c of the bridge 108c is shaped to correspond to the shape and configuration of the bridge 108c and the crimps 112a, 112b. Furthermore, the first crimp 112a and the second crimp 112b may be rigidly and fixedly attached to the plastic body 22c at the pocket 28c. Since the bridge 108c is engaged with the plastic body 22c at the pocket 28c, the bridge 108c moves in conjunction with the plastic body 22c during operation of the actuator 12, as described above. The plastic body 22c is non-electrically conductive such that electrical current may flow through the bridge 108c without any electrical current traveling through the plastic body 22c. Thus, electrical current is prevented from traveling to other elements contained within the cavity 16 of the actuator 12 via the plastic body 22c.

Figure 7:
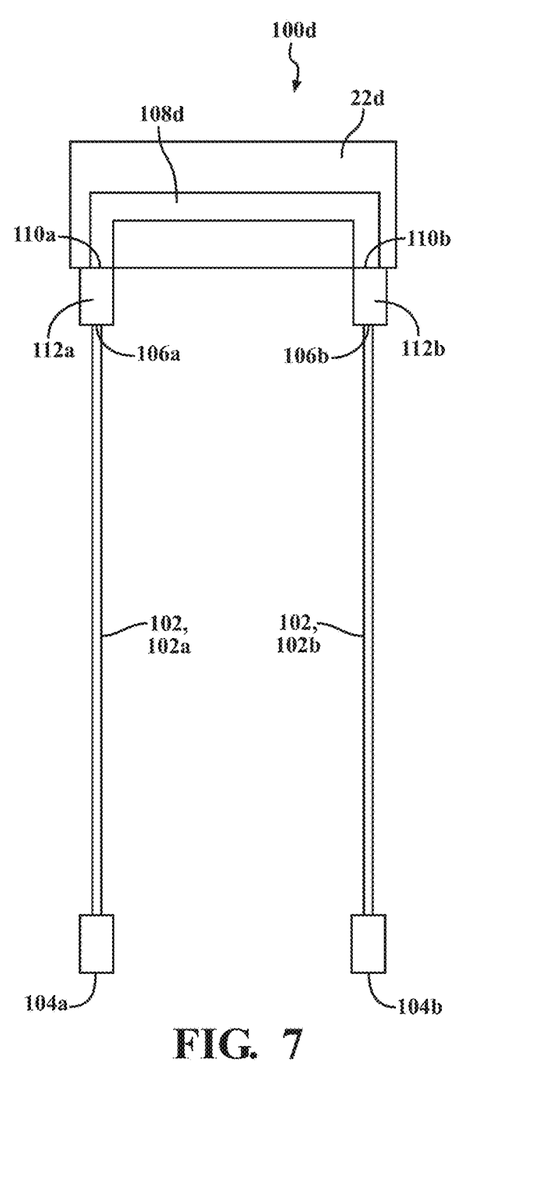
FIG. 7 is a side view of a dual linear shape memory alloy wire and an overmolded plastic body.

With particular reference to FIG. 7, an SMA wire assembly 100d is provided. In view of the substantial similarity in structure and function of the components associated with the SMA wire assembly 100, like reference numerals are used hereinafter and in the drawings to identify like components while like reference numerals containing letter and/or number extensions are used to identify those components that have been modified.

The SMA wire assembly 100d includes a bridge 108d that engages with a plastic body 22d when installed in the actuator 12 (FIG. 2). The bridge 108d is over-molded in the plastic body 22d, which fixes the bridge 108d to the plastic body 22d. For example, the bridge 108d may be integrally formed with the plastic body 22d. Thus, the bridge 108d and the plastic body 22d may linearly move as a single unit during operation of the actuator 12. Furthermore, the first crimp 112a and the second crimp 112b are external of the plastic body 22d while still electrically and fixedly engaged with the bridge 108. As the plastic body 22d is non-electrically conductive, electrical current may flow through the bridge 108d without any electrical current traveling through the plastic body 22d, which prevents electrical current from traveling to other elements contained within the cavity 16 of the actuator 12 via the plastic body 22d.

Referring again to FIGS. 1-7, the SMA wire assembly 100 is included in the actuator 12. The actuator 12 may be translated between the first state 200 and the second state 202. During translation of the actuator 12 between the first state 200 and the second state 202, the pair of SMA wires 102 undergo linear solid-state phase transformation. The first crimp 112a and the second crimp 112b offer a robust method of connecting the pair of SMA wire 102 to the bridge 108 in an effort to prevent snapping or breaking of the SMA wire assembly 100 where the pair of SMA wires 102 meet the bridge 108. Furthermore, as the pair of SMA wires 102 are configured in a linear orientation, compression and lengthening during linear solid-state phase transformation of the pair of SMA wire 102 only occur linearly, as any bending or curving included in the SMA wire assembly 100 is solely accommodated by the bridge 108. Since the bridge 108 is free of solid-state phase transformation properties, the bridge 108 maintains a singular shape, orientation, and dimension regardless of electrical current flowing through the SMA wire assembly 100. Solid-state phase transformation occurring at a wire in a linear configuration, as opposed to occurring at a wire in a bent or curved configuration, reduces the potential for failure or breaking of the wire.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A shape memory alloy (SMA) wire assembly comprising:
   a first crimp;
   a second crimp;
   a metallic bridge including a first wire end and a second wire end opposite the first wire end;
   a first SMA wire being configured in a linear orientation and including a first mounting end and a first bridge end opposite the first mounting end, the first bridge end fixedly coupled to the first wire end of the metallic bridge via the first crimp;
   a second SMA wire being configured in the linear orientation and including a second mounting end and a second bridge end opposite the second mounting end, the second bridge end fixedly coupled to the second wire end of the metallic bridge via the second crimp; and
   an actuator including a plastic body, the metallic bridge being coupled to the plastic body.

2. The SMA wire assembly of claim 1, wherein the first SMA wire has a first length and a first tension and the second SMA wire has a second length and a second tension, the first length being equal to the second length and the first tension being equal to the second tension.

3. The SMA wire assembly of claim 1, wherein the first crimp and the second crimp are integrally formed with the metallic bridge, the first crimp disposed at the first wire end of the metallic bridge and the second crimp disposed at the second wire end of the metallic bridge.

4. The SMA wire assembly of claim 1, wherein the first wire end of the metallic bridge is configured to receive the first crimp, and the second wire end of the metallic bridge is configured to receive the second crimp.

5. The SMA wire assembly of claim 1, wherein the first crimp and the second crimp are rigidly and fixedly attached to the plastic body of the actuator.

6. The SMA wire assembly of claim 1, wherein the metallic bridge is configured to be over-molded to the plastic body of the actuator.

7. The SMA wire assembly of claim 1, wherein the metallic bridge is configured to be engaged with a pocket of the plastic body of the actuator.

8. The SMA wire assembly of claim 1, wherein the first SMA wire and the second SMA wire each comprises a conductive material that is configured to accommodate linear solid-state phase transformation of the first SMA wire and the second SMA wire.

9. An actuator comprising:
   a plastic body; and
   an SMA wire assembly including:
      a first crimp;
      a second crimp;
      a metallic bridge including a first wire end and a second wire end opposite the first wire end;
      a first SMA wire being linearly configured and including a first mounting end, a first bridge end opposite the first mounting end, and a conductive material, the first bridge end fixedly coupled to the first wire end of the metallic bridge via the first crimp, the conductive material being configured to accommodate linear solid-state phase transformation of the first SMA wire; and
      a second SMA wire being linearly configured and including a second mounting end, a second bridge end opposite the second mounting end, and a conductive material, the second bridge end fixedly coupled to the second wire end of the metallic bridge via the second crimp, the conductive material configured to accommodate linear solid-state phase transformation of the second SMA wire.

10. The actuator of claim 9, wherein the first SMA wire has a first length and a first tension and the second SMA wire has a second length and a second tension, the first length being equal to the second length and the first tension being equal to the second tension.

11. The actuator of claim 9, wherein the first crimp and the second crimp are integrally formed with the metallic bridge, the first crimp disposed at the first wire end of the metallic bridge and the second crimp disposed at the second wire end of the metallic bridge.

12. The actuator of claim 9, wherein the first wire end of the metallic bridge is configured to receive the first crimp, and the second wire end of the metallic bridge is configured to receive the second crimp.

13. The actuator of claim 9, wherein the metallic bridge is coupled to the plastic body.

14. The actuator of claim 9, wherein the metallic bridge is configured to be over-molded to the plastic body.

15. The actuator of claim 9, wherein the metallic bridge is configured to be engaged with a pocket of the plastic body.

16. A vehicle comprising:
   an actuator including:
      a plastic body; and
      an SMA wire assembly including:
         a first crimp;
         a second crimp;
         a metallic bridge including a first wire end and a second wire end opposite the first wire end;
         a first SMA wire, linearly configured, and including a first mounting end and a first bridge end opposite the first mounting end, and a conductive material, the first bridge end fixedly coupled to the first wire end of the metallic bridge via the first crimp, the conductive material configured to accommodate linear solid-state phase transformation of the first SMA wire; and
         a second SMA wire, linearly configured, and including a second mounting end and a second bridge end opposite the second mounting end, and a conductive material, the second bridge end fixedly coupled to the second wire end of the metallic bridge via the second crimp, the conductive material configured to accommodate linear solid-state phase transformation of the second SMA wire.

17. The vehicle of claim 16, wherein the first crimp and the second crimp are integrally formed with the metallic bridge, the first crimp disposed at the first wire end of the metallic bridge and the second crimp disposed at the second wire end of the metallic bridge.

18. The vehicle of claim 16, wherein the first wire end of the metallic bridge is configured to receive the first crimp, and the second wire end of the metallic bridge is configured to receive the second crimp.

19. The vehicle of claim 16, wherein the metallic bridge is coupled to the plastic body.

* * * * *